(12) United States Patent
Peng et al.

(10) Patent No.: US 11,776,784 B2
(45) Date of Patent: Oct. 3, 2023

(54) CONTROL OF DIRECT CURRENT CIRCUIT BREAKERS WITH SERIES SEMICONDUCTOR SWITCHES

(71) Applicant: North Carolina State University, Raleigh, NC (US)

(72) Inventors: Chang Peng, Raleigh, NC (US); Iqbal Husain, Cary, NC (US); Qin Huang, Austin, TX (US); Landon K. Mackey, Raleigh, NC (US)

(73) Assignee: NORTH CAROLINA STATE UNIVERSITY, Raleigh, NC (US)

( * ) Notice: Subject to any disclaimer, the term of this patent is extended or adjusted under 35 U.S.C. 154(b) by 261 days.

(21) Appl. No.: 17/277,918

(22) PCT Filed: Sep. 21, 2019

(86) PCT No.: PCT/US2019/052306
§ 371 (c)(1),
(2) Date: Mar. 19, 2021

(87) PCT Pub. No.: WO2020/061547
PCT Pub. Date: Mar. 26, 2020

(65) Prior Publication Data
US 2022/0122801 A1    Apr. 21, 2022

Related U.S. Application Data

(60) Provisional application No. 62/734,430, filed on Sep. 21, 2018.

(51) Int. Cl.
*H01H 89/00* (2006.01)
*H02H 1/00* (2006.01)
*H02H 3/08* (2006.01)

(52) U.S. Cl.
CPC .......... *H01H 89/00* (2013.01); *H02H 1/0007* (2013.01); *H02H 3/08* (2013.01)

(58) Field of Classification Search
CPC ................. H01H 89/00; H01H 33/596; H01H 2009/543; H01H 9/542; H01H 9/548; H02H 1/0007; H02H 3/08; H02H 3/087
See application file for complete search history.

(56) References Cited

U.S. PATENT DOCUMENTS 8,717,716 B2    5/2014  Hafner et al.
8,891,209 B2    11/2014 Haffner
(Continued)

FOREIGN PATENT DOCUMENTS

WO    2014177874 A2    11/2014

OTHER PUBLICATIONS

C. Peng "A Medium-Voltage Hybrid DC Circuit Breaker—Part II: Ultrafast Mechanical Switch," in IEEE Journal of Emerging and Selected Topics in Power Electronics, vol. 5, No. 1, pp. 289-296, Mar. 2017. Retrieved from Internet: < https://ieeexplore.ieee.org/stamp/stamp.jsp?tp=&arnumber=7590000> (Year: 2017).*

(Continued)

*Primary Examiner* — Jared Fureman
*Assistant Examiner* — Nicolas Bellido
(74) *Attorney, Agent, or Firm* — Thomas | Horstemeyer, LLP (57) ABSTRACT

Various examples are provided related to direct current circuit breakers and their control methods. In one example, among others, a hybrid direct current circuit breaker (DCCB) includes an ultrafast mechanical switch (UFMS) connected in series with a commutating switch (CS) or auxiliary circuit breaker (ACB); a main breaker (MB) including a series of η semiconductor switching stages in parallel with the UFMS and CS or ACB; and control (Continued)

circuitry that can turn off individual switching stages in a defined order in response to opening contacts of the UFMS. The switching stages can be turned off based upon a dielectric strength across the contacts as they open. In another example, a method includes opening contacts of an UFMS connected in series with a CS or ACB; and turning off individual switching stages of a series of $\eta$ semiconductor switching stages connected across the UFMS and the CS or ACB.

20 Claims, 11 Drawing Sheets

(56) References Cited

U.S. PATENT DOCUMENTS

| | | | |
|---|---|---|---|
| 9,373,473 | B2 | 6/2016 | Dupraz et al. |
| 9,948,084 | B2 | 4/2018 | Sim |
| 2012/0299393 | A1* | 11/2012 | Hafner ............... H01H 9/548 |
| | | | 307/113 |
| 2013/0278078 | A1* | 10/2013 | Ohlsson ............. H02H 3/025 |
| | | | 307/113 |
| 2016/0105014 | A1* | 4/2016 | Lee .................... H02H 3/087 |
| | | | 361/93.1 |
| 2016/0322184 | A1 | 11/2016 | Schmitz et al. |
| 2018/0019583 | A1 | 1/2018 | Dupraz |
| 2021/0006063 | A1* | 1/2021 | Mackey ............. H02H 1/0007 |

OTHER PUBLICATIONS

C. Peng "A Fast Mechanical Switch for Medium-Voltage Hybrid DC and AC Circuit Breakers," in IEEE Transactions on Industry Applications, vol. 52, No. 4, pp. 2911-2918, Jul.-Aug. 2016. Retrieved from Internet: < https://ieeexplore.ieee.org/stamp/stamp.jsp?tp=&arnumber=7428893> (Year: 2016).*

International Search Report for PCT/US19/52306 dated Dec. 11, 2019.

\* cited by examiner

TABLE. I. Dielectric Strength of UFMS

| Time | Displacement | Dielectric Strength |
|---|---|---|
| 1.0 ms | 2.0 mm | 40 kV |
| 2.0 ms | 5.0 mm | 100 kV |
| 3.1 ms | 8.0 mm | 160 kV |

TABLE. II. Progressively switched hybrid DCCB parameters

| Component | Parameter | Units |
|---|---|---|
| $V_{source}$ | 425 | $V_{DC}$ |
| $I_{load}$ | 20 | $A_{DC}$ |
| $R_{load}$ | 20 | $\Omega$ |
| $L_{line}$ | 2.5 | $mH$ |
| $V_{varistor}$ | 100 – 120 | $V_{DC}$ |
| $V_{clamping}$ | 175 | $V_{DC}$ |

TABLE. III. Progressively switched hybrid DCCB test results

| Metric | Progressively Switched | Single-Stage | Units |
|---|---|---|---|
| $t_{isolation}$ | 3.31 | 4.23 | $ms$ |
| $E_{absorbed}$ | 2.52 | 7.21 | $J$ |

FIG. 14D

CONTROL OF DIRECT CURRENT CIRCUIT BREAKERS WITH SERIES SEMICONDUCTOR SWITCHES

CROSS-REFERENCE TO RELATED APPLICATIONS

This application is a national stage entry pursuant to 35 U.S.C. § 371 of International Application No. PCT/US2019/052306, filed on Sep. 21, 2019, which claims priority to, and the benefit of, U.S. provisional application entitled "Control of HVDC Circuit Breakers with Series HV Semiconductor Switches" having Ser. No. 62/734,430, filed Sep. 21, 2018, both of which are hereby incorporated by reference in their entireties.

BACKGROUND

Increasing interest in distributed renewable energy resources has led to increased direct current (DC) circuit protection research. Achieving fast and efficient circuit protection is important to DC system safety. The lack of natural current zero crossing in DC and other variable current applications prevents natural arc extinction during mechanical contact separation. Large, expensive electromechanical switchgear, or smaller and faster solid-state switches which consume real power, have been used to address this sustained arching with mixed results.

SUMMARY

Aspects of the present disclosure are related to direct current circuit breakers and their control methods. In one aspect, among others, a hybrid direct current circuit breaker (DCCB) comprises an ultrafast mechanical switch (UFMS) connected in series with a commutating switch (CS) or auxiliary circuit breaker (ACB); a main breaker (MB) comprising a series of n semiconductor switching stages connected in parallel with the UFMS and CS or ACB; and control circuitry configured to turn off individual switching stages in a defined order in response to opening contacts of the UFMS. The individual switching stages can be turned off based upon a dielectric strength established across the contacts of the UFMS as the contacts open. Corresponding surge arrestors can be coupled across the individual switching stages of the series of n semiconductor switching stages.

In one or more aspects, the dielectric strength can correspond to a distance between the contacts of the UFMS. The control circuitry can be configured to determine a current dielectric strength based upon a sensed contact displacement of the UFMS; and turn off the individual switching stages in response to the current dielectric strength exceeding blocking voltage ratings of the corresponding surge arrestors coupled across individual switching stages. The individual switching stages of the series of n semiconductor switching stages can be sequentially turned off in response to the current dielectric strength exceeding the blocking voltage ratings. The control circuitry can be configured to turn off the individual switching stages in response to a series of preset time values associated with an opening speed of the contacts of the UFMS, the preset time values corresponding to the dielectric strength established across the contacts of the UFMS exceeding blocking voltage ratings of the corresponding surge arrestors coupled across individual switching stages.

The control circuitry can be configured to turn on the series of n semiconductor switching stages of the MB and turn off the CS or ACB before opening the contacts of the UFMS. The contacts of the UFMS can be opened in response to a fault condition. The contacts of the UFMS can be opened in response to current flowing through the UFMS and CS or ACB exceeding a predefined threshold. In various aspects, the control circuitry can be configured to identify an anomaly in current isolation during opening of the contacts of the UFMS based upon monitored voltage and current of the DCCB. The control circuitry can continuously monitors current through and voltage across the DCCB while opening the contacts of the UFMS. The anomaly can comprise switch arcing or restrike.

In another aspect, a method for controlled opening of a hybrid direct current circuit breaker (DCCB) comprises opening contacts of an ultrafast mechanical switch (UFMS) of the hybrid DCCB connected in series with a commutating switch (CS) or auxiliary circuit breaker (ACB); and turning off individual switching stages of a series of n semiconductor switching stages connected across the UFMS and the CS or ACB connected in series with the UFMS. The individual switching stages can be turned off based upon a dielectric strength established across the contacts of the UFMS, where turning off the individual switching stages redirects current through corresponding surge arrestors connected across the individual switching stages. In various aspects, the method can comprise turning on the series of n semiconductor switching stages and turning off the CS or ACB before opening the contacts of the UFMS. The contacts of the UFMS can be opened in response to current flowing through the UFMS and CS or ACB exceeding a predefined threshold.

In one or more aspects, the dielectric strength can be determined based upon a sensed contact displacement. The individual switching stages can be turned off in response to the dielectric strength exceeding blocking voltage ratings of the corresponding surge arrestors connected across the individual switching stages. The dielectric strength can be determined based upon preset time values corresponding to contact displacement after initiating opening the contacts of the UFMS. The individual switching stages can be turned off in response to a series of preset time values associated with an opening speed of the contacts of the UFMS. In some aspects, the method can comprise identifying an anomaly in DCCB operation during opening of the contacts of the UFMS based upon monitored voltage and current of the DCCB. Current through and voltage across the DCCB can be continuously monitored during opening of the contacts of the UFMS.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Disclosed herein are various examples related to high voltage (HV) direct current circuit breakers (DCCBs) and their control methods. A combination of electromechanical switchgear and solid-state switch topologies, known as a hybrid direct current circuit breaker (DCCB), can be used to address the sustained arcing present in DC circuit protection. This design exploits the benefits of each by providing a low resistance mechanical contact coupled with high-speed semiconductor switches. Together, these topologies seek to achieve high speed and high-efficiency DCCBs. However, fault isolation speed is limited by the time needed for the mechanical switch to achieve sufficient dielectric strength across the contacts.

Hybrid DCCBs (see, e.g., FIG. 2) provide a low resistance current path through the ultrafast mechanical switch (UFMS) and commutating switch (CS) during normal operation. To isolate a fault, the CS directs current flow to the parallel solid-state branch known as the main breaker (MB), allowing the UFMS to open under a zero-current condition which prevents arcing. Once an adequate dielectric strength is established across the contacts of the UFMS, current flow can be interrupted by the MB. The solid-state branch comprises high voltage power semiconductor devices which can isolate current flow in several microseconds (μsec). However, the speed of semiconductor switches sacrifices efficiency due to high conduction losses. Because the overall operation time of a hybrid DCCB is dependent upon the mechanical switch speed, the fault current continues to rise throughout the entire opening sequence.

In this disclosure, a progressive solid-state switching method for hybrid DCCBs is disclosed to dynamically control the voltage potential across the mechanical switch. Fault current is curtailed during the mechanical switch opening sequence rather than waiting until the mechanical switch is fully open. The proposed switching method can reduce fault isolation time and limit the peak fault current during breaker operation, thereby improving system stability. DC system dynamics are explored and the voltage withstand capability of an ultrafast mechanical switch (UFMS) is analyzed. The characteristics were used to design a progressive switching method in computer simulation, which was validated experimentally with a test prototype.

As will be discussed, the fault characteristics of the DC distribution can be assessed and the unique protection requirements analyzed. To begin, the challenge of the hybrid DCCB and the operation of the circuit breaker is reviewed, illustrating the need for innovation. The proposed progressive switching of hybrid DCCBs is then presented in analytical form, and the concept is tested in computer simulation. Next, the design process of each hybrid DCCB subsystem and the coordination of the subsystems is assessed. The experimental results of the test prototype are presented to validate the analytical and simulation models. Finally, the findings of the progressive switching method are discussed, and the key contributions made by the progressive switching of the hybrid DCCB summarized. Reference will now be made in detail to the description of the embodiments as illustrated in the drawings, wherein like reference numbers indicate like parts throughout the several views.

DC Protection

To address the challenges of DC distribution system protection, DC fault characteristics are analyzed and the hybrid DCCB topology is reviewed.

DC Distribution Fault Characterization. While UFMS actuation has become very fast, the operation time of the switch and dissipation of the voltage surge felt across the DCCB limits the isolation time. This voltage surge, due to stored system energy, exceeds the nominal voltage rating during fault isolation. DC systems have lower inductance than alternating current (AC) systems due to inverter decoupling of motor windings, replacement of the power transformer with power electronics, and smaller transmission distances. Therefore, the DC fault current rises faster than in AC systems, requiring faster protection. Current-limited voltage source converters (VSCs) most commonly supply DC distribution systems. Voltage collapse occurs quickly in these systems because converters are unable to supply fault current the way conventional rotational generation can. Therefore, high-speed fault current isolation and localized fault current limiting are important for DC distribution systems.

Figure 1:
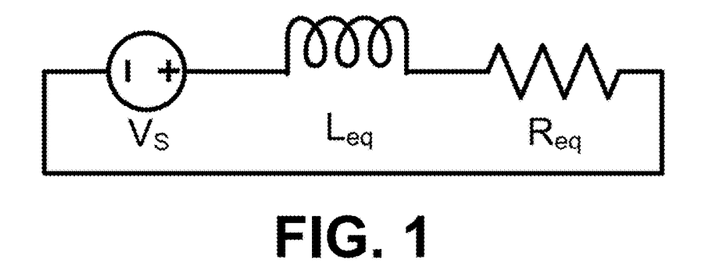
FIG. 1 illustrates an example of a simplified analytical model of a hybrid direct current circuit breaker (DCCB), in accordance with various embodiments of the present disclosure.

Referring to FIG. 1, shown is a simplified equivalent circuit of a hybrid DCCB. This model includes the voltage source $V_s$, equivalent line inductance $L_{eq}$, and equivalent resistance of the on-state losses and contact resistance, $R_{eq}$. Solving for voltage, this gives $$V_s = L_{eq}\frac{di(t)}{dt} + R_{eq}i(t).$$

If a pre-fault current $I_0$ is assumed with some value between $+I_{max}$ and $-I_{max}$, the value of fault current and fault current derivative are given by $$i(t) = \frac{V_S}{R_{eq}} + \left(I_0 - \frac{V_S}{R_{eq}}\right)e^{-\left(\frac{R_{eq}}{L_{eq}}\right)t}, \quad (1)$$

$$i'(t) = \left(-\frac{R_{eq}}{L_{eq}}I_0 - \frac{V_s}{L_{eq}}\right)e^{-\left(\frac{R_{eq}}{L_{eq}}\right)t}. \quad (2)$$

Proper component selection and system design results in a very low value of $R_{eq}$. For $R_{eq}\approx 0$, the current derivative is given by $V_s/L_{eq}$, resulting in a linear fault current rise. This high $$\frac{di}{dt}$$

fault current rise will quickly exceed the current limitation of the connected VSCs. To protect themselves, the VSCs then enter constant current mode, also known as current limiting. This transition can cause a rapid and cascading voltage collapse of the connected system if the short circuit fault persists.

Figure 2A:
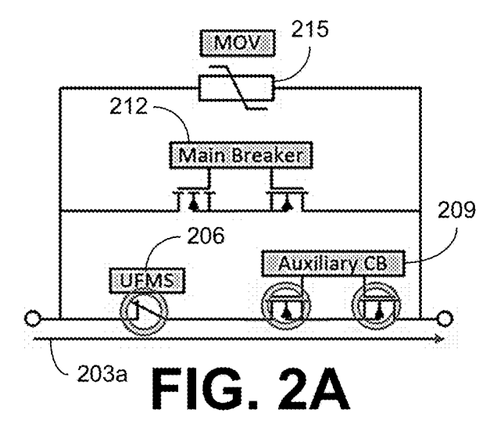
FIGS. 2A-2D illustrate an example of an opening sequence of a hybrid DCCB, in accordance with various embodiments of the present disclosure.
Figure 2B:
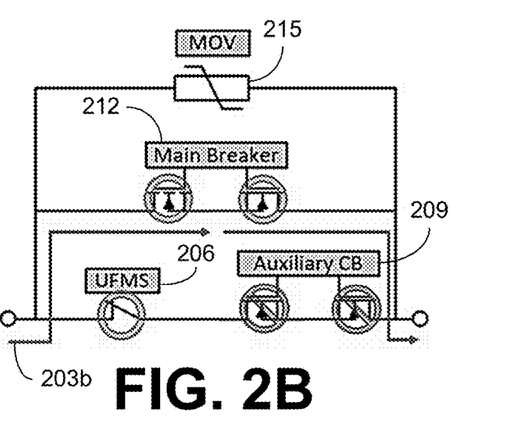
Figure 2C:
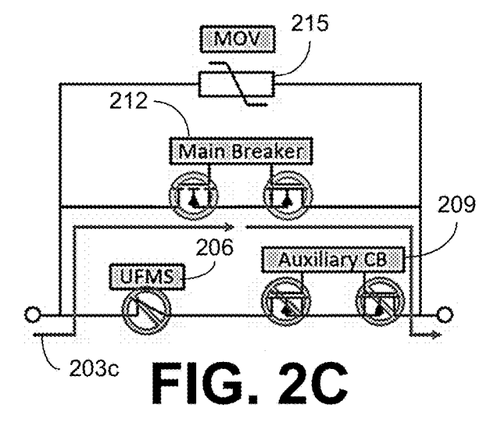
Figure 2D:
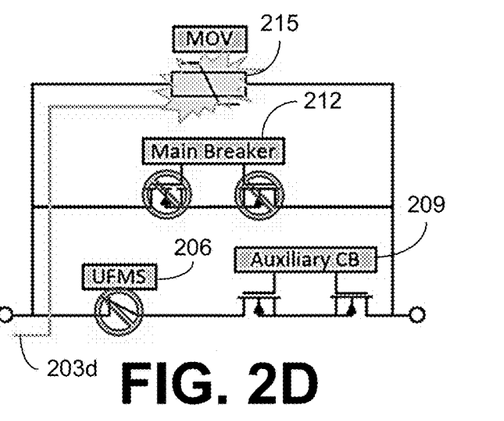

Isolation Speed Challenge with Hybrid DCCBs. A hybrid DCCB comprises two parallel branches. One includes semiconductor switches only, known as the MB. The parallel conduction path comprises the CS and UFMS, the two being connected in series. The later branch functions as the load current conduction path during normal operation. The fault isolation procedure, while variable by design, includes the following steps as illustrated in FIGS. 2A-2D:
 (a) During normal operating condition, current 203a passes through the UFMS 206 and CS (or auxiliary CB) 209, as shown in FIG. 2A.
 (b) Once a fault is detected, the MB 212 turns on and the CS 209 turns off, commutating load current 203b to the MB 212 within several μsec, as shown in FIG. 2B.
 (c) While load and fault current 203c are flowing through the MB 212, the UFMS 206 opens with zero current flow, preventing arcing, as shown in FIG. 2C.
 (d) When the dielectric strength of the vacuum gap in the UFMS 206 can withstand the transient interruption voltage (TIV) the MB 212 turns off, stopping current flow and isolating the fault. The voltage surge due to system inductance is clamped and excess energy 203d is absorbed by the surge arrestor 215 which can be a metal oxide varistor (MOV) or other appropriate device, as shown in FIG. 2D.

Figure 3:
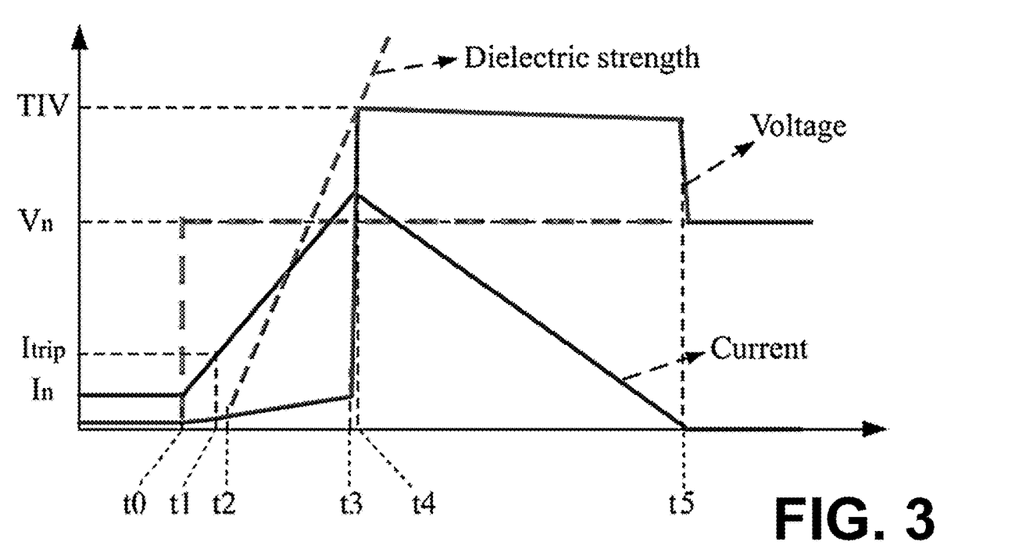
FIG. 3 graphically illustrates an example of the operation of the hybrid DCCB of FIGS. 2A-2D, in accordance with various embodiments of the present disclosure.

This operation sequence provides minimal on-state power consumption during normal operation in (a) coupled with fast, arc-free current isolation with the MB 212 in (d). Idealized current and voltage waveforms, and the dielectric strength of a UFMS 206 across a typical hybrid DCCB are shown in the plot of FIG. 3. These waveforms correspond to the steps explained in FIGS. 2A-2D, with significant events occurring at times $t_0$ through $t_5$.
 $t_0$ A downstream overcurrent fault initiates from a normal operating condition prior to time $t_0$.
 $t_1$ Fault current reaches the trip setpoint at time $t_1$, beginning the protective action sequence.
 $t_2$ The CS 209 turns off which commutates the fault current to the MB 212 and the UFMS 206 begins opening and increasing the vacuum gap dielectric strength.
 $t_3$ The UFMS 206 contacts gain sufficient separation and the MB turns off.
 $t_4$ Voltage across the DCCB quickly rises until it is clamped by the MOV 215 and the excess system energy is absorbed by the MOV 215.
 $t_5$ Excess energy has been absorbed, fault current dissipated to zero, and the system is fully isolated.

Analysis of FIG. 3 and the current calculations given by equations (1) and (2) illustrate that the isolation time of a hybrid DCCB is restricted by the millisecond (msec) operation time of the UFMS 203. Fault current continues to rise in the system until adequate dielectric strength is achieved to withstand both nominal system voltage and the TIV across the DCCB due to system inductance and stored capacitance being dissipated.

Progressive Switching of Hybrid DCCB

A new solid-state branch design and progressive switching method is presented which curtails fault current in the MB while the UFMS opening sequence occurs. Curtailing fault current reduces the fault isolation time of hybrid DCCBs by limiting the peak fault current $I_{peak}$, which subsequently requires less energy absorption by the clamping action of the MOVs. Progressive switching of the MB provides several key features to enhance DC distribution system protection:
 Protects connected electronics by limiting the current peak observed by the system;
 Reduces fault isolation time by quenching the energy surge faster;
 Minimizes the energy absorption requirements of the connected MOV surge arrestors, prolonging their lifespan;
 Naturally balances the energy of series-connected power semiconductor devices by separating them into stages;
 Prevents voltage collapse of the entire distribution system by providing localized current limiting;
 Enables detection and correction of mechanical switch arcing or restrike; and/or
 Enables tertiary features such as soft-start of downstream equipment.

Figure 4:
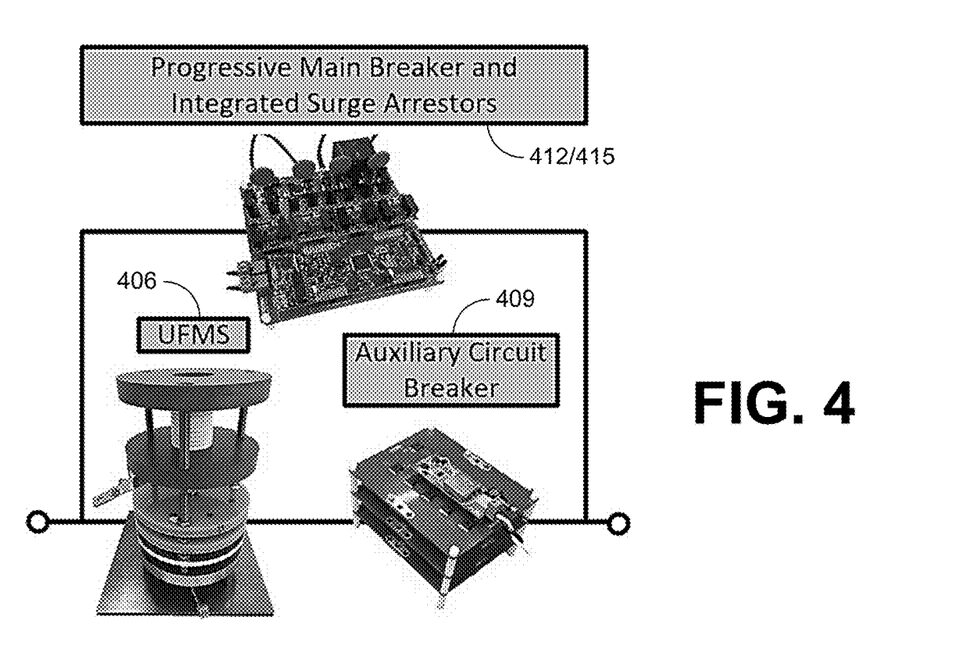
FIG. 4 is a block diagram including images that illustrate an example of a progressively switched, actively damped ultrafast mechanical switch (UFMS) hybrid DCCB, in accordance with various embodiments of the present disclosure.
Figure 5:
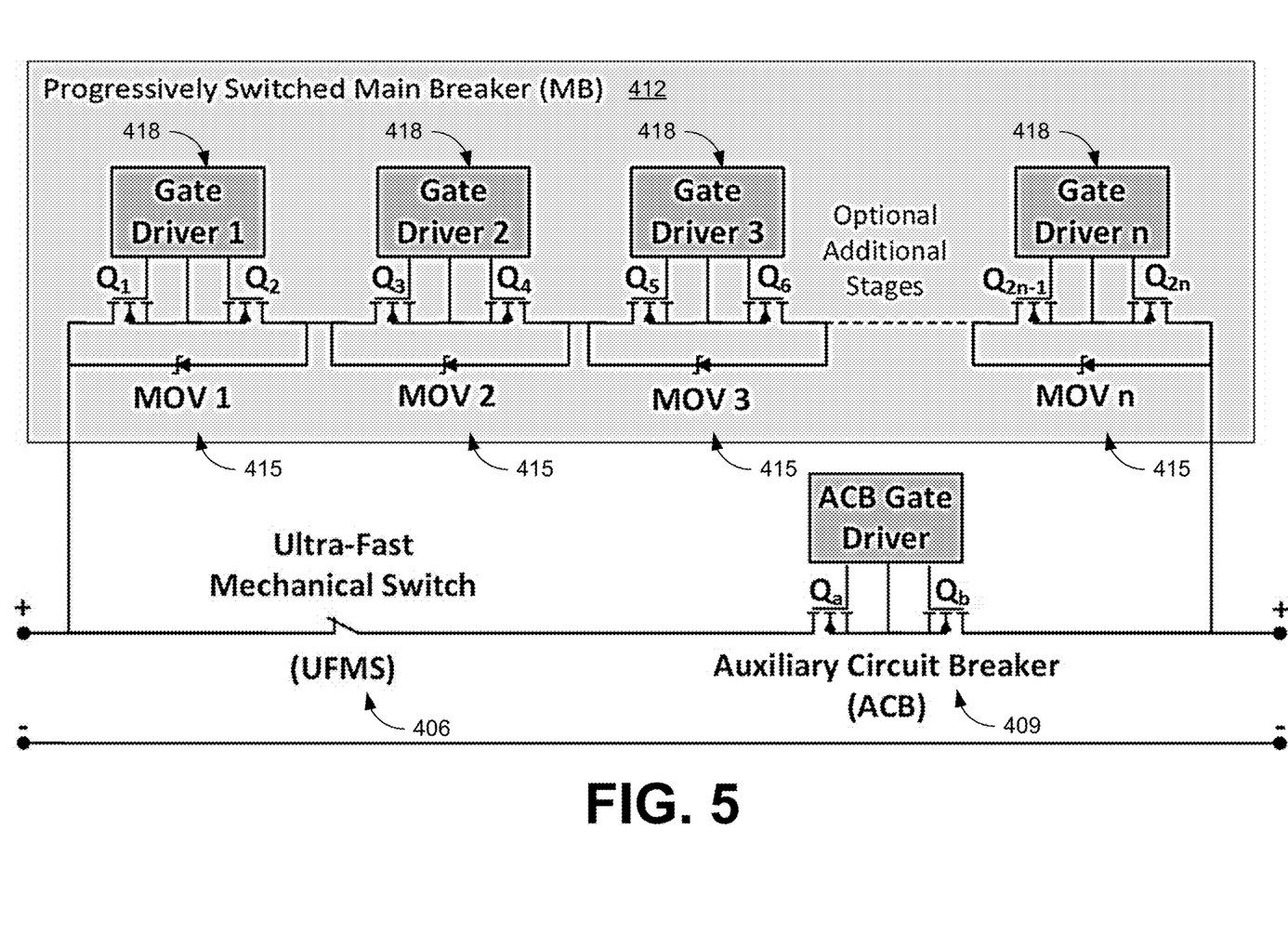
FIG. 5 is a schematic diagram illustrating a progressively switched hybrid DCCB of FIG. 4, in accordance with various embodiments of the present disclosure.

A progressively switched hybrid DCCB block diagram is shown in FIG. 4, and the simplified schematic is shown in FIG. 5. In the example of FIG. 5, the MB 412 includes n switching stages 418 with each having an integrated surge arrestor (e.g., MOV) 415. This new approach at hybrid DCCBs sequentially turns off the $1^{st}$, $2^{nd}$, $3^{rd}$, and so on up to the $n^{th}$ stage 418 of the series-connected semiconductor switches ($Q_1$-$Q_{2n}$) in the MB 412. This process incrementally steps up the voltage across the circuit breaker to match the UFMS 406 dielectric strength and limit fault current.

Figure 6:
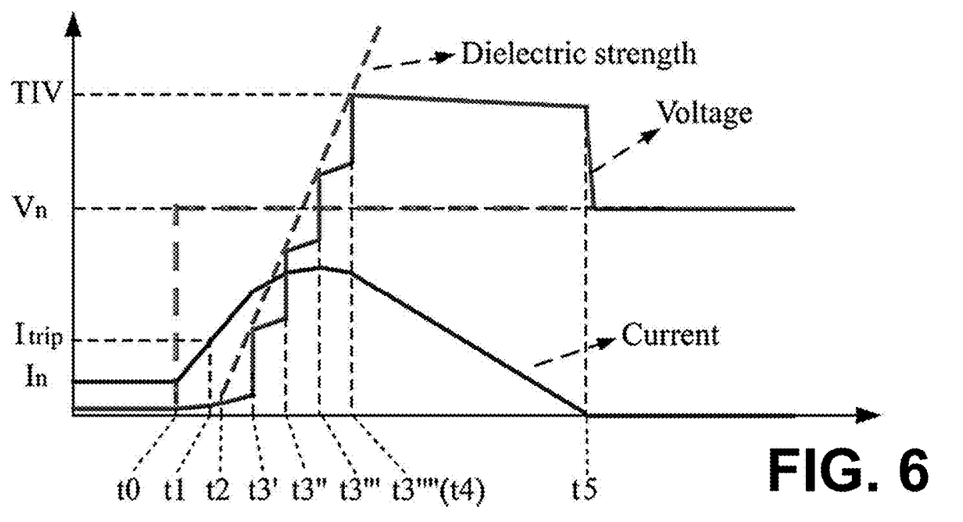
FIG. 6 graphically illustrates an example of the operation of the progressive hybrid DCCB of FIG. 5, in accordance with various embodiments of the present disclosure.

The incremental voltage steps that are shown in FIG. 6 correspond with the UFMS 406 displacement during the opening sequence, and therefore, align with the combined dielectric strength of the UFMS vacuum chamber, $V_{ds}$, and the blocking voltage of the CS, $V_{cs}$, balancing the two branches of the hybrid DCCB to minimize the $I_{peak}$ observed during fault isolation.

Compared to the fault isolation stages of the hybrid DCCB discussed with respect to FIGS. 2A-2D, progressive switching of the MB 412 has several extra control steps. Initially, the sequence starts the same from $t_0$ through $t_2$. However, after the breaker controller sends the gate signal to open the UFMS 406 with active damping, it does not wait for the switch to fully open prior to turning off the MB 412. Depending on the dielectric medium, the UFMS 406 gains a specific voltage withstand capability proportional to contact displacement. Once this matches the blocking voltage rating of the first stage MOV 415, the controller turns off the switches ($Q_1$-$Q_2$) of the corresponding switching stage 418. The fault current now flows through the first stage MOV 415 and the rest of the on switches ($Q_3$-$Q_{2n}$). As the UFMS contact displacement grows, the controller turns off each semiconductor switch stage 418 matching the dielectric strength of the UFMS 406 and the MOVs 415 placed across the MB 412. This switching sequence is illustrated in the plot of FIG. 6.

- $t_0$-$t_2$ Same Operation as in the single-stage hybrid DCCB. Normal operation before $t_0$ where the fault occurs, the trip setpoint is reached at $t_1$ and the CS 409 turns off and UFMS 406 starts opening at $t_2$.
- $t_3'$ The controller determines the UFMS dielectric strength is capable of withstanding $V_{stage1}$ and turns off the solid-state switches ($Q_1$-$Q_2$) of the first stage 418. This begins to curtail fault current and absorb energy in MOV 1 (415).
- $t_3''$-$t_3''$ As the dielectric strength of the UFMS continues to rise, each subsequent solid-state switch stage 418 in the MB is turned off to correspond with the $V_{stage(n)}$ for that stage 418.
- $t_4$ Once all n stages 418 have been switched off, the remaining energy due to system inductance is dissipated by the MOVs 415 in each stage, now all connected in series.
- $t_5$ Same Operation as in the single-stage hybrid. Excess energy has been absorbed, fault current dissipated to zero, and the system is fully isolated.

Coordinating progressive switching of the MB 412 with the dielectric strength in the UFMS 406 allows the current isolation process to begin as soon as sufficient vacuum gap exists. This principle is illustrated in a hybrid DCCB simulation with a 2 ms UFMS in FIG. 7. The trace 703 shows that a 400% nominal $I_{peak}$ is sustained by the simulated single-stage hybrid DCCB. In a single-stage hybrid DCCB, the UFMS 206 (FIGS. 2A-2D) needs to fully open prior to isolation of fault current. However, a four-stage progressively switched MB 412 (FIG. 5) under the same test conditions only observes a 225% current spike and isolates fault current 28% faster than a single-stage operation as observed with the current trace 706. Furthermore, an eight-stage progressively switched MB isolates 45% faster and $I_{peak}$ is reduced to 180% nominal current flow (trace 709). While a higher number of stages 418 (FIG. 5) isolate fault current faster and minimize the energy absorption needed, additional cost and DCCB complexity are considered when selecting the number of progressively switched stages 418.

Figure 7:
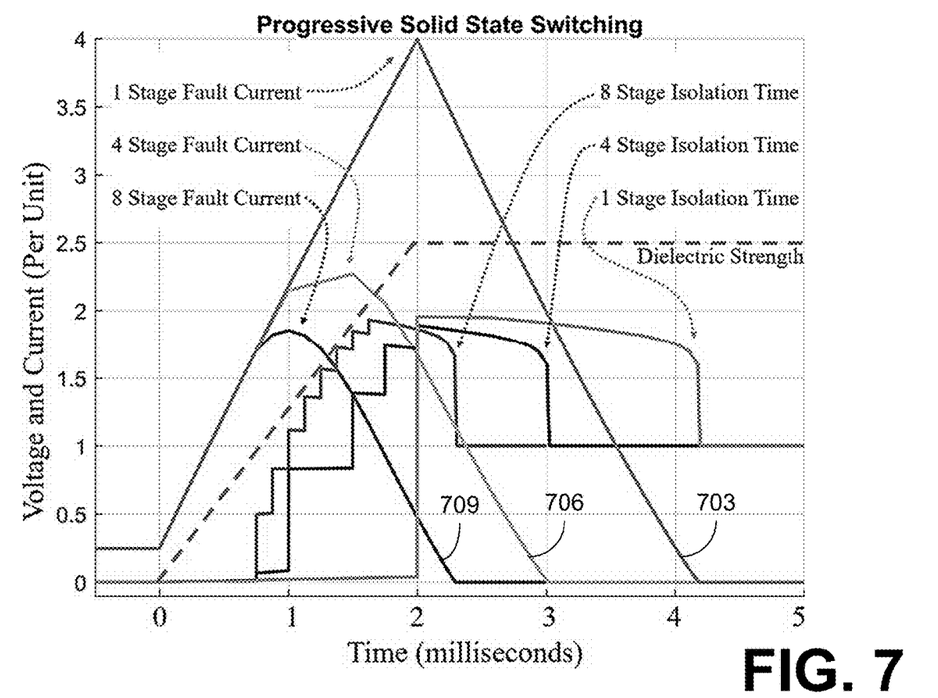
FIG. 7 graphically compares simulation examples of a 2 ms UFMS operating as a single (1) stage hybrid DCCB, and as four (4) stage and eight (8) stage progressively switched hybrid DCCBs, in accordance with various embodiments of the present disclosure.

During progressive shutdown, the transient current observed in FIG. 7 is described in $$i(t) = \left(i(t_n) - \frac{\Delta V_s}{R_n}\right)e^{-\left(\frac{R_n}{L_{eq}}\right)(t-t_n)} + \frac{\Delta V_s}{R_n}. \quad (3)$$

$V_s$ represents the source voltage where the voltage across each stage is $\Delta V_s = V_s - \Sigma_{k=1}^n V_k$, where $V_k$ and $R_k$ model the MOV voltage drop and leakage current resistance, respectively. $R_n = R_{Load} \| R_{Fault} + \Sigma_{k=1}^n R_k$, and finally, $t_n$ is the time when the $n^{th}$ switching stage 418 turns off.

Figure 8:
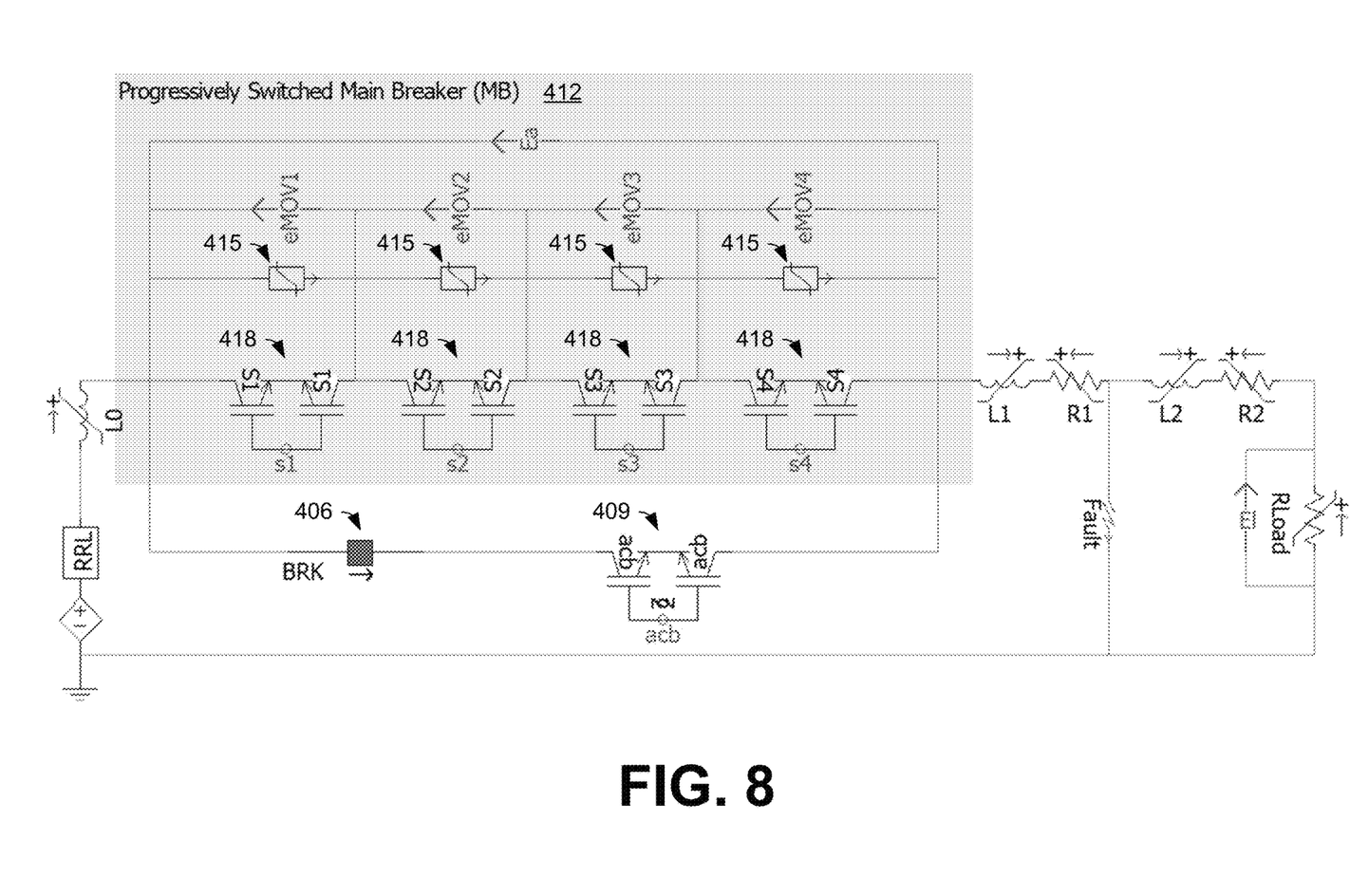
FIG. 8 graphically illustrates an example of a simulation of a progressively switched hybrid DCCB, in accordance with various embodiments of the present disclosure.

Using the progressive switching method, the voltage differential is coordinated between the solid-state and mechanical switches. Using equation (3), the number and voltage level of the stages can be optimized to match the UFMS dielectric strength. The semiconductor switches start limiting fault current up to 1.3 ms earlier than a single-stage hybrid DCCB. As a result, the switches completely isolate the fault 1.3 ms and 1.9 ms faster with four-stages and eight-stages, respectively. Therefore, the fault current is curtailed while the UFMS 406 opens, protecting connected converters, and increasing system stability. The DCCB operation was simulated in PSCAD, using the system shown in FIG. 8, and the control was integrated and tested in PLECS Processor-in-the-Loop (PIL), to test fault detection and control algorithms in real-time.

During fault isolation, the current and voltage sensing systems are continuously monitoring the voltage across and current through the DCCB, and the displacement of the UFMS. Onboard controls can determine if the switch is isolating fault current in accordance with design parameters or if an anomaly has occurred, such as a component failure in the main breaker or arcing and/or restrike within the UFMS. Each of n stages can have discrete current and voltage parameters as discussed with respect to equation (3), allowing the sensed current or voltage to be used to both determine if an internal error has occurred and take corrective action during isolation to compensate for the error.

As the semiconductor switches progressively turn off, the MOVs 415 appear in the main current conducting path. This creates a piecewise linear function. The MOVs 415 were modeled as an ideal diode with a blocking voltage, $V_k$, and leakage current resistance, $R_k$. Each additional MOV 415 reduces the slope of the fault current rise as the semiconductor stages 418 turn off which reduces the fault current peak. The peak current is given by $(V_s - \Sigma_{k=1}^n V_k)/L_{eq}$, where n is the switch number, and the current can be observed in FIGS. 6 and 7. This reduces the fault current peak. When the last stage turns off and all transient energy has been absorbed, the current falls to zero.

Prototype Design

To validate the analytical and simulation work that was completed, a test prototype was developed and tested in the laboratory. The prototype design and construction for the MB 412, UFMS 406, and CS 409 will now be described. Finally, the controls, communication, and onboard sensing are presented.

Figure 9:
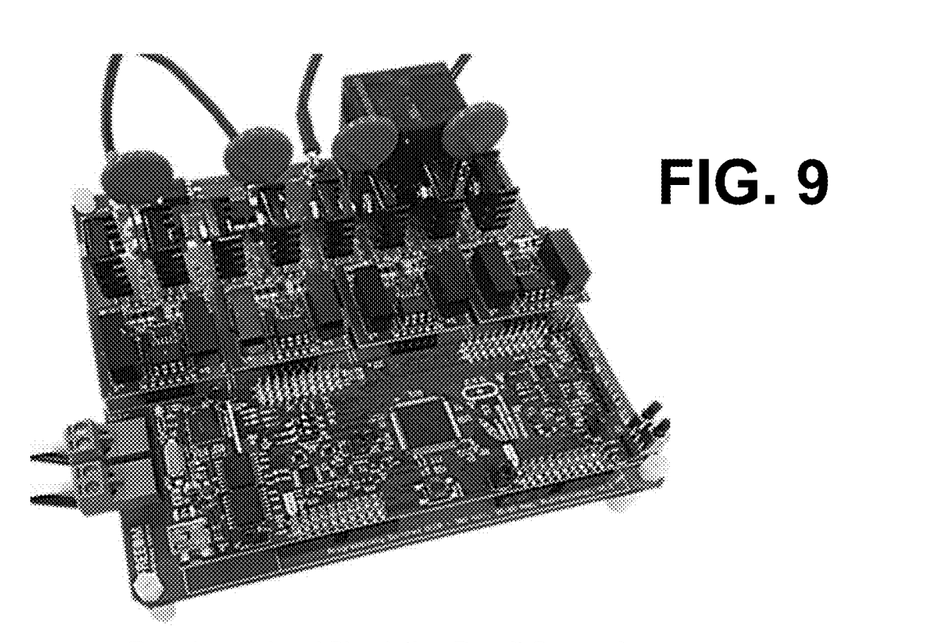
FIG. 9 is an image of a four (4) stage progressively switched main breaker (MB) of the progressively switched hybrid DCCB of FIG. 4, in accordance with various embodiments of the present disclosure.

Progressively Switched Main Breaker. FIG. 9 is an image of the implemented 4-stage progressively switched MB 412. Control circuitry using, e.g., an onboard digital signal processor (DSP), can operate the four individual gate driver circuits where each gate driver operates a pair of common-source connected metal oxide field effect transistors (MOSFETs) to provide fast switching and simplicity in bidirectional power flow. Unipolar devices, such as MOSFETs, provide fast switching time and low on-state resistance ($R_{ds,on}$). To achieve isolation well into the medium voltage (MVDC) range of 3.2 kV-69 kV, bipolar devices, such as insulated-gate bipolar transistors (IGBTs) with a constant voltage drop per module, can be used. Progressive switching of the MB 412 naturally balances the voltage across devices in series to achieve higher blocking voltage while maintaining protection of each device.

The MOV varistor voltage curve dictates the magnitude of each sequenced voltage step. These curves are non-linear and, therefore, each voltage step is a range of isolation, rather than an exact level. MOVs are subject to degradation over time and cycling. Progressive switching reduces the amount of energy that needs to be absorbed by the overall MOV network during isolation by minimizing the overshoot of the fault current. The MOVs used in the prototype were rated to withstand 20 times more energy per cycle than the worst case isolation scenario of the conditions listed in the table of FIG. 14A. MOVs can be connected in parallel for additional energy absorption capacity at an incremental cost. Finally, the shutdown sequence of the stages 418 can be rotated each operation through the control to ensure equal stress and wear on the four stages 418 of the DCCB.

Figure 10:
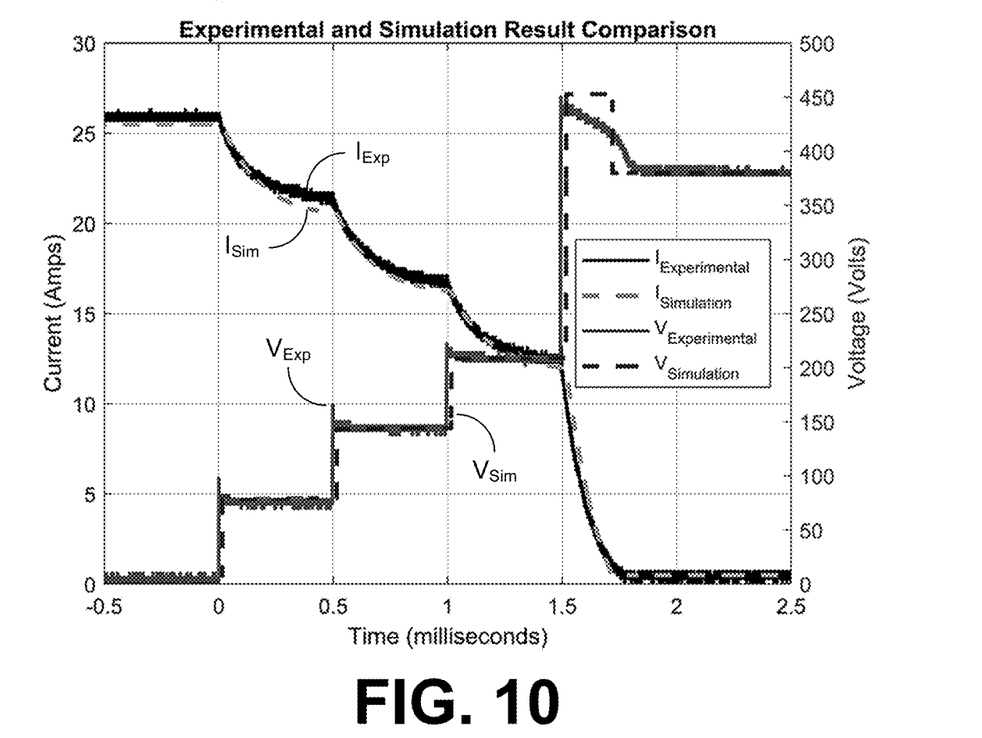
FIG. 10 graphically illustrates experimental test waveforms and simulation results of the 4 stage progressively switched MB of FIG. 9, in accordance with various embodiments of the present disclosure.

Standalone solid-state testing results of the progressively switched MB 412 is compared to the simulation in FIG. 10. The MB 412 was tested in a 380 volt, 25 amp, 1.5 ms isolation sequence, experimentally validating the simulation and analytical analysis. The progressive switching method was found to hold true and can be extended to the MVDC voltage level. Commercially available power semiconductor devices such as, e.g., IGBT modules are available with voltage and current ratings in excess of 6.5 kV and 3.6 kA, respectively. The advantages of progressive switching are more significant at these voltage and current levels as the mechanical operation time of UFMS devices for MVDC is longer than for LVDC.

Figure 11A:
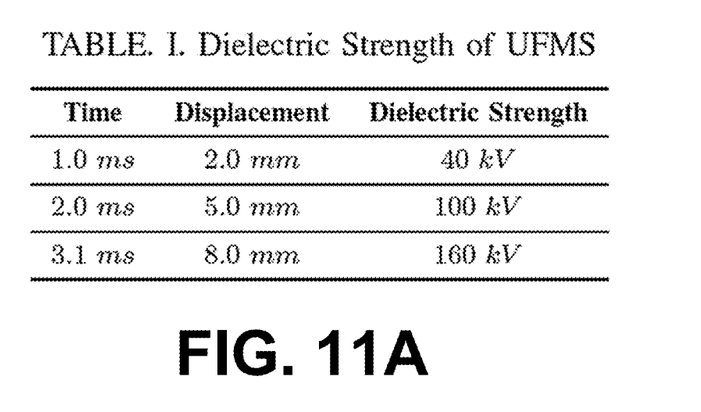
FIGS. 11A and 11B illustrate operational characteristics of a UFMS of the progressively switched hybrid DCCB of FIG. 4, in accordance with various embodiments of the present disclosure.
Figure 11B:
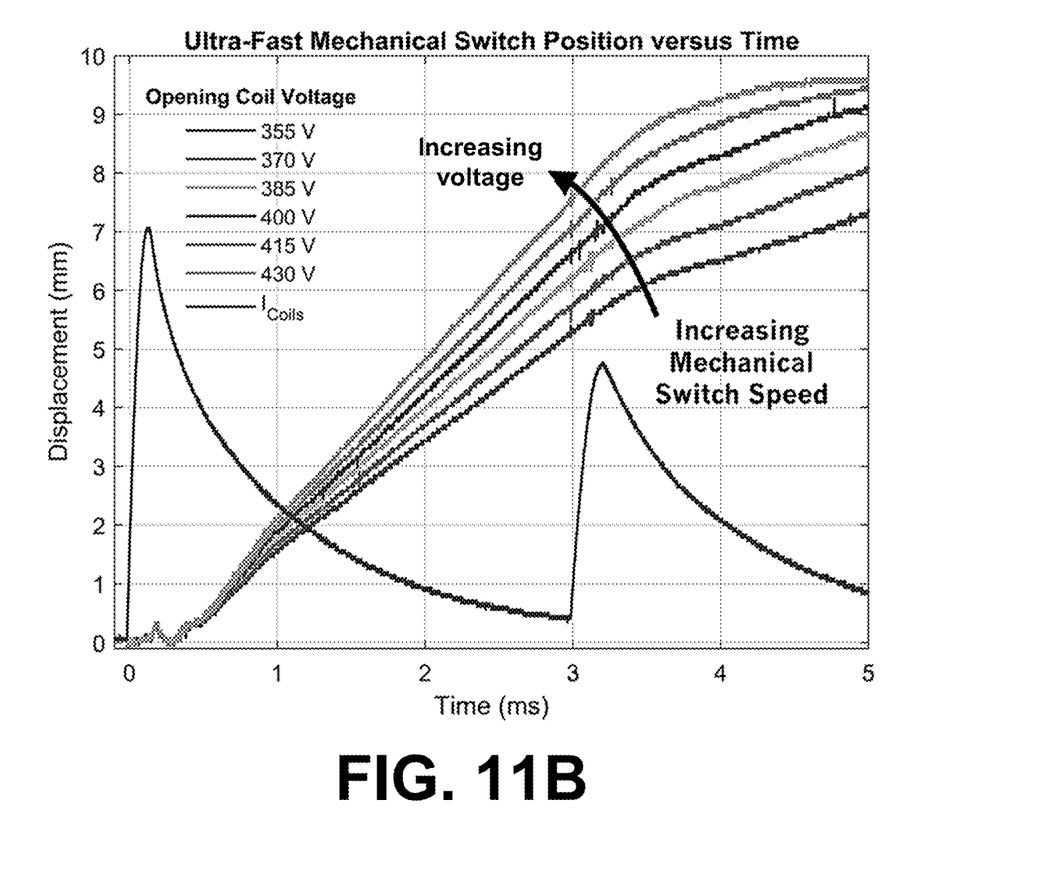

Actively Damped Ultrafast Mechanical Switch. The UFMS 406 that was analyzed utilizes an innovative actively damped Thomson coil actuator (TCA) to open a vacuum interrupter and provide adequate dielectric strength for medium voltage applications within 1-3 ms. The rated vacuum of commercial vacuum interrupters is 10-5 Pascals (Pa) or 10-7 Torr corresponding to a dielectric strength of 20-40 kV. The table of FIG. 11A illustrates key isolation points in the UFMS 406 as shown in FIG. 11B.

Actively damped Thomson Coil actuation is achieved through discharging the energy of a capacitor bank through a small number of turns in the opening coil of the actuator. This action generates a strong magnetomotive force (MMF), where MMF=NI, where N is the number of turns and I can be several kiloamps. The generated field cuts through a conductive copper disk connected to the vacuum interrupter movable contact. The copper disk generates eddy currents creating an MMF in the opposite direction of the coil and a strong repulsive force. This action accelerates the movable mass in the open direction. As the contacts approach fully open, a second capacitor bank discharges through the closing coil. This absorbs the majority of the kinetic energy and helps bring the movable mass to a resting position with its mechanical spring.

Modular Commutating Switch. The CS, also known as an auxiliary circuit breaker (ACB) or Load Commutating switch (LCS), 409 is located in series with the UFMS 406 to commutate load or fault current to the MB 412 during isolation. It is desirable for the CS 409 to have a low on-state resistance or voltage drop to minimize power consumption, but be capable of commutating current to the MB during any fault condition.

The modular CS 409 designed for the progressively switched hybrid DCCB can be expanded incrementally to meet the nominal current and power consumption demands for a given application. The CS 409 can utilize parallel MOSFETs connected in a common-source configuration for high efficiency and bidirectional power flow. The on-state power consumption of the CS 409 is a function of the on-state resistance of the MOSFET array with $n_{ser}$ MOSFETs in series and $n_{par}$ MOSFETs in parallel and current, I. Therefore, the total hybrid DCCB efficiency including the UFMS contact resistance is given by $$\eta = 1 - \left( \frac{I^2 \left( \frac{R_{ds,on} n_{ser}}{n_{par}} + R_{ufms} \right)}{L_{eq}} \right), \quad (4)$$

where the instantaneous power level of the DCCB is $P_{accb} = V_s I^2$.

The rated blocking voltage of the CS 409 is designed to ensure full commutation of fault current to the MB 412 under all conditions. For MOSFET unipolar devices, $R_{ds,on}$ causes the voltage drop across the MB 412 to rise linearly in proportion to the fault current, and therefore, the CS 409 needs to be able to block a voltage high enough to overcome $I_{peak} R_{eq}$ of all stages in series. For IGBT bipolar devices with forward voltage drop, $V_f$, and body diode forward voltage, $V_{bd}$, the CS 409 must overcome $\Sigma V_f + V_{bd}$.

Figure 12:
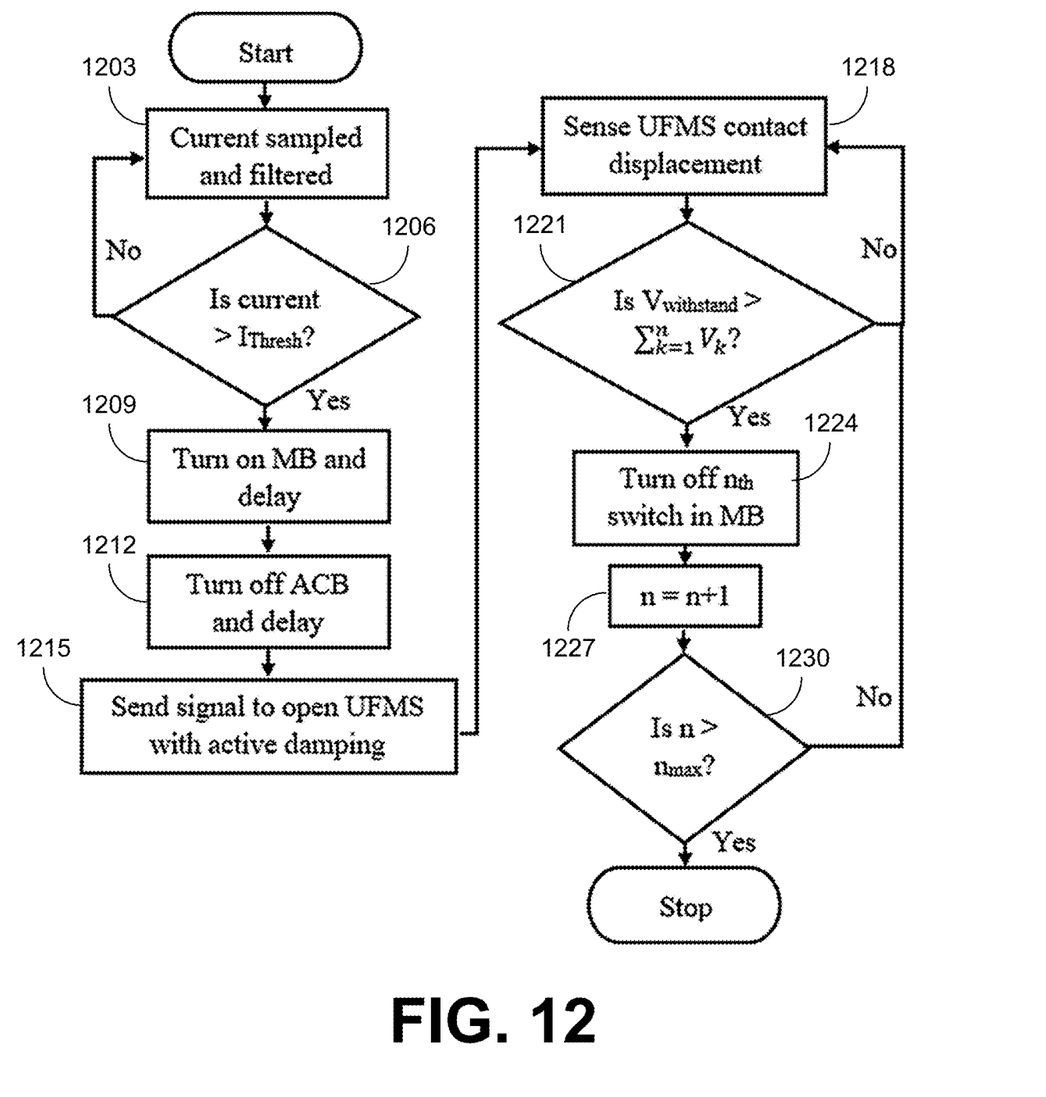
FIG. 12 is a control logic flowchart illustrating an example of the progressive shutdown of the progressively switched hybrid DCCB of FIG. 4, in accordance with various embodiments of the present disclosure.

Integrated Sensing, Communication, and Breaker Controls. The control of the progressive switching of a hybrid DCCB can be executed via the logic flowchart shown in FIG. 12. Beginning at 1203, the current can be sampled and filtered and then compared to a threshold at 1206. Here, $I_{Thresh}$ depicts the overcurrent threshold, $I_{trip}$ or $$\frac{di}{dt}$$

rate that will initiate the fault isolation process. If the current is greater than the threshold, then the MB 412 is turned on at 1209 and the CS (or ACB) 409 is turned on at 1212. A signal to open the UFMS 406 can then be sent at 1215. Contact displacement of the UFMS 406 can be sensed at 1218. The withstand voltage $V_{withstand}$ is the dielectric strength of the UFMS 406 as its contacts open. The stage index, n, and the total number of stages, $n_{max}$, control which stage is under operation. If the withstand voltage is greater than the defined voltage for the current stage index at 1221, then next switch stage in the MB 412 is turned off at 1224 and the stage index is incremented at 1227. If the stage index is greater than $n_{max}$ at 1230, than the turnoff process ends. Otherwise, the process returns to 1218 to continues sensing the UFMS contact displacement. With integrated voltage and current sensors, the onboard controls can be programmed to provide a wide array of protective functions including:

Manual Open and Manual Close;
Overcurrent;
Rate of current rise $\left(\frac{di}{dt}\right)$;

Undervoltage;
Ground fault current interruption (GFCI);
Input noise or irregularity shutdown to protect sensitive electronic equipment; and/or
Over or under power (kW) trip.

The DSP controller can implement dielectric strength coordination with two different switching control algorithms. First, static switching control can operate the MB stages 418 based on preset time values according to the operation characteristics of the UFMS 406 for a low computational cost. Alternatively, dynamic switching control can be implemented by actively sensing the displacement of the UFMS position sensor and the voltage differential across the MB 412 in real-time. The control circuitry (e.g., a DSP) can determine if adequate dielectric strength has been established to switch off the next sequential stage 418 of the MB 412. With this same mechanism, restrike and arcing can be detected in the vacuum operator by the differential voltage sensors and action can be taken to prevent damage to the UFMS 406.

Communication between the subsystems of the hybrid DCCB can be via fiber optic link(s) to minimize signal latency and provide electric isolation between the subsystems. In the prototype, a DSP board was housed directly on the progressively switched MB 412 and fiber optic links are connected to the driver system of the UFMS 406 and the gate drivers of the CS 409, respectively.

Experimental Results

Figure 13:
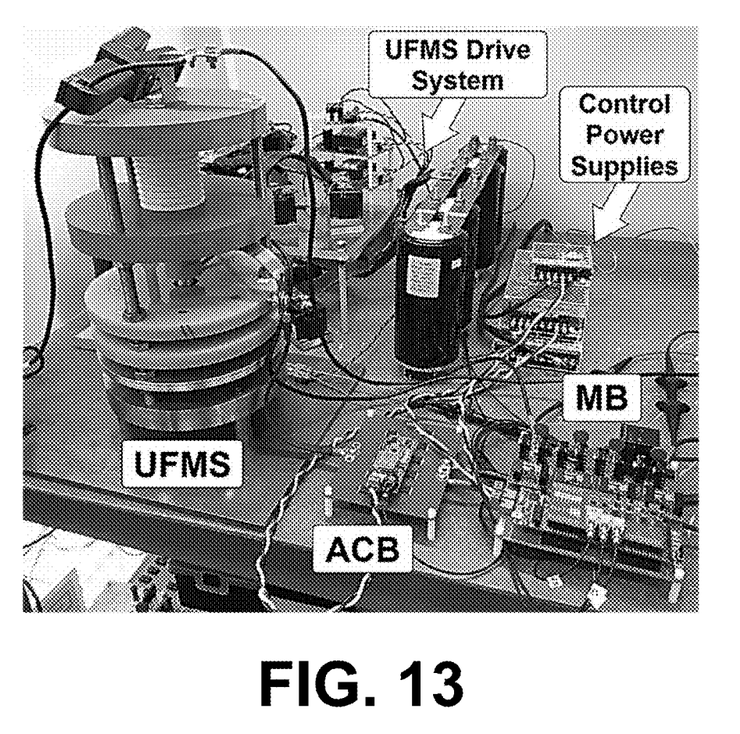
FIG. 13 is an image of the progressively switched, actively damped UFMS, hybrid DCCB test prototype, in accordance with various embodiments of the present disclosure.
Figure 14A:
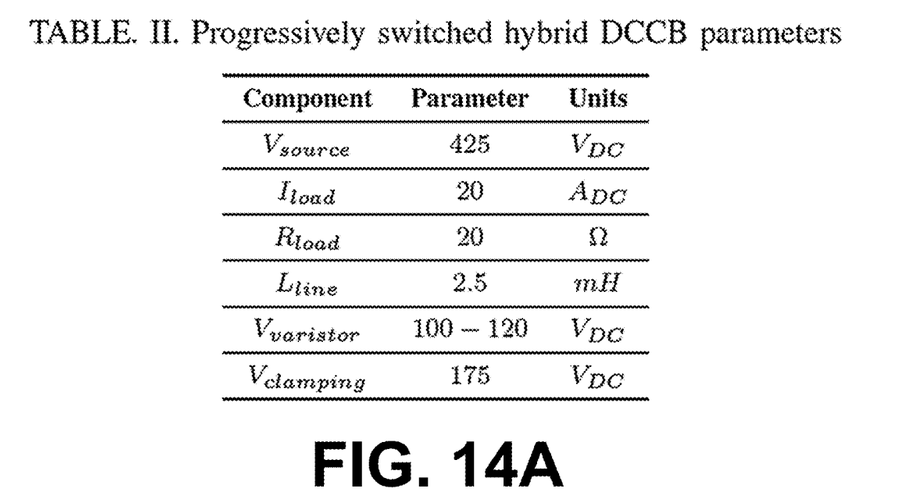
FIGS. 14A-14D illustrate parameters, waveforms and test results of the progressively switched, actively damped UFMS, hybrid DCCB test prototype, in accordance with various embodiments of the present disclosure.
Figure 14B:
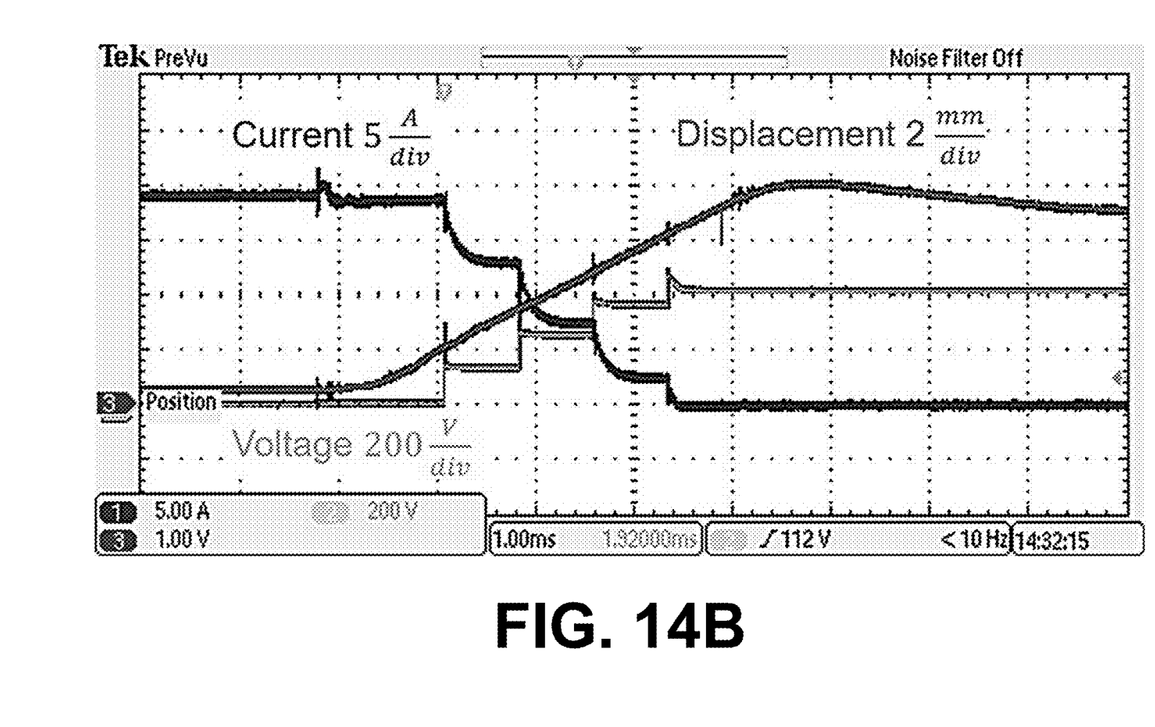
Figure 14C:
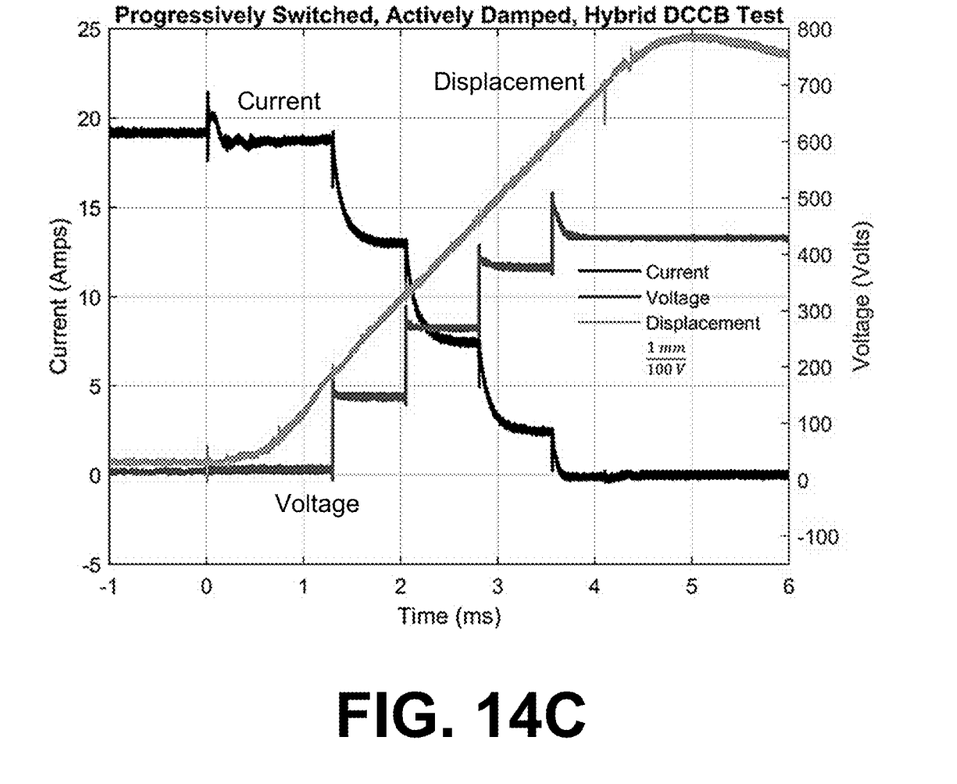
Figure 14D:
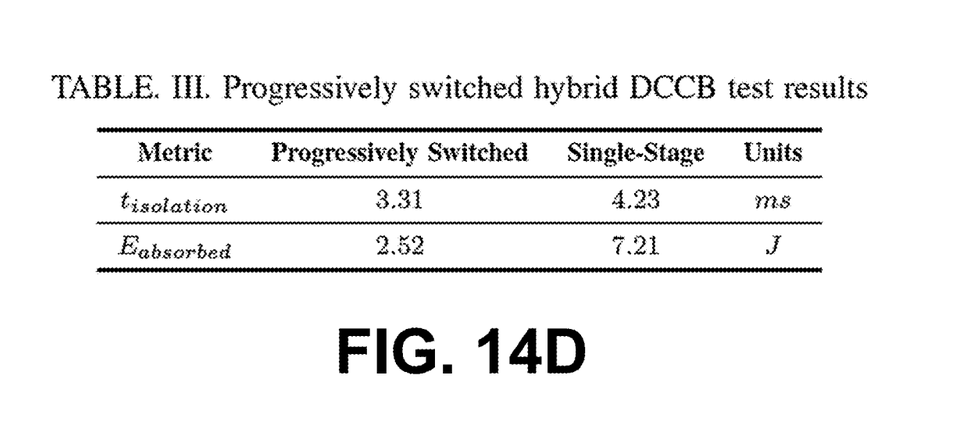

Referring to FIG. 13, shown is the test prototype, which was tested under the conditions listed in the table in FIG. 14A to validate the analytical and computer simulation accuracy. Experimental voltage and current waveforms of the four-stage progressively switched, actively damped hybrid DCCB are shown in FIGS. 14B and 14C, and key testing parameters are listed in the table in FIG. 14D.

In this prototype, the CS 409 and UFMS 406 were rated for higher currents and voltages than the MB 412 as a proof of concept. The test was operated on a per unit basis to show the current curtailment during isolation and coordination of the dielectric strength of the UFMS 406 and progressively switched MB 412. Additionally, it was tested under static conditions, as shown in the table of FIG. 14A and the waveforms of FIGS. 14B and 14C. Validation of progressive switching may also be demonstrated by performing fault isolation during a short circuit event and developing a MVDC device.

A Progressively Switched, Actively Damped, Hybrid DCCB has been presented with design and operational details coupled with analysis and computer simulation based modeling. A prototype was fabricated and tested to validate the analytical and computer simulation models. This new hybrid DCCB design coordinates the voltage potential exerted across the solid-state switches of the hybrid DCCB with the UFMS displacement corresponding to the dielectric strength of the vacuum interrupter. A four-stage test prototype hybrid DCCB validated PSCAD and PLECS models and component controls. This hybrid DCCB design allows the solid-state switches to curtail fault current intermittently during UFMS opening operation by progressively switching off separate stages. It facilitates DCCB design with smaller, less expensive components and naturally balances the voltage differential across series connected power semiconductor devices. The progressive switching method requires less energy dissipation in the surge arrestor network, prolonging the life of the devices, minimizing system stress, and isolating fault current fast. The switching method proposed improves system stability by preventing voltage collapse in distribution systems supplied by converters.

A four-stage progressively switched hybrid DCCB was implemented and shown to shorten fault isolation time by 1.3 ms in simulation and 0.9 ms. It also reduces fault current by about 175%, and can utilize devices with 45% the blocking voltage of the single-stage DCCB with the same isolation capability. Progressive switching can be readily applied to other existing hybrid DCCB designs to enable faster isolation of DC faults and limitation of peak fault current. Through progressive switching, MVDC distribution in residential microgrids, DC ships, data centers, and other applications can be enabled. DC faults can be isolated faster while placing less voltage strain on DCCB components using progressive switching, facilitating the use of smaller and more efficient devices to reduce cost and size while maximizing the benefits of the hybrid DCCB design.

Scalability: The disclosed progressive solid-state and hybrid switching schemes can be scaled throughout the low-voltage direct current (LVDC) and medium-voltage direct current (LVDC) voltage and current ranges. The same concepts can be utilized in providing protection for multi-terminal high voltage direct current (HVDC) and ultra-high voltage direct current (UHVDC) systems. The design is not limited to MOSFETS and MOVs as other appropriate devices or system of devices with the inherent design capabilities can achieve these functions at various system design conditions.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Any process descriptions or blocks in flow charts should be understood as representing modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure.

The flowchart of FIG. 12 shows the architecture, functionality, and operation of a possible implementation of hybrid DCCB control system. In this regard, each block represents a module, segment, or portion of code, which comprises one or more executable instructions for implementing the specified logical function(s). It should also be noted that in some alternative implementations, the functions noted in the blocks may occur out of the order noted in FIG. 12. For example, two blocks shown in succession in FIG. 12 may in fact be executed substantially concurrently or the blocks may sometimes be executed in the reverse order, depending upon the functionality involved.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

The invention claimed is:

1. A hybrid direct current circuit breaker (DCCB), comprising:
an ultrafast mechanical switch (UFMS) connected in series with a commutating switch (CS) or auxiliary circuit breaker (ACB);
a main breaker (MB) comprising a series of n semiconductor switching stages connected in parallel with the UFMS and CS or ACB, where corresponding surge arrestors are coupled across individual switching stages of the series of n semiconductor switching stages; and
control circuitry configured to turn off the individual switching stages in a defined order in response to opening contacts of the UFMS, where the individual switching stages are turned off based upon a dielectric strength established across the contacts of the UFMS as the contacts open.

2. The hybrid DCCB of claim 1, wherein the dielectric strength corresponds to a distance between the contacts of the UFMS.

3. The hybrid DCCB of claim 2, wherein the control circuitry is configured to:
determine a current dielectric strength based upon a sensed contact displacement of the UFMS; and
turn off the individual switching stages in response to the current dielectric strength exceeding blocking voltage ratings of the corresponding surge arrestors coupled across the individual switching stages.

4. The hybrid DCCB of claim 3, wherein the individual switching stages of the series of n semiconductor switching stages are sequentially turned off in response to the current dielectric strength exceeding the blocking voltage ratings.

5. The hybrid DCCB of claim 2, wherein the control circuitry is configured to turn off the individual switching stages in response to a series of preset time values associated with an opening speed of the contacts of the UFMS, the series of preset time values corresponding to the dielectric strength established across the contacts of the UFMS exceeding blocking voltage ratings of the corresponding surge arrestors coupled across the individual switching stages.

6. The hybrid DCCB of claim 2, wherein the control circuitry is configured to turn on the series of n semiconductor switching stages of the MB and turn off the CS or ACB before opening the contacts of the UFMS.

7. The hybrid DCCB of claim 6, wherein the contacts of the UFMS are opened in response to a fault condition.

8. The hybrid DCCB of claim 7, wherein the contacts of the UFMS are opened in response to current flowing through the UFMS and CS or ACB exceeding a predefined threshold.

9. The hybrid DCCB of claim 1, wherein the control circuitry is configured to identify an anomaly in current isolation during opening of the contacts of the UFMS based upon monitored voltage and current of the hybrid DCCB.

10. The hybrid DCCB of claim 9, wherein the control circuitry continuously monitors current through and voltage across the hybrid DCCB while opening the contacts of the UFMS.

11. The hybrid DCCB of claim 9, wherein the anomaly comprises switch arcing or restrike.

12. A method for controlled opening of a hybrid direct current circuit breaker (DCCB), comprising:
opening contacts of an ultrafast mechanical switch (UFMS) of the hybrid DCCB connected in series with a commutating switch (CS) or auxiliary circuit breaker (ACB); and
turning off individual switching stages of a series of n semiconductor switching stages connected across the UFMS and the CS or ACB connected in series with the UFMS, the individual switching stages turned off based upon a dielectric strength established across the contacts of the UFMS, where turning off the individual switching stages redirects current through corresponding surge arrestors connected across the individual switching stages.

13. The method of claim 12, further comprising turning on the series of n semiconductor switching stages and turning off the CS or ACB before opening the contacts of the UFMS.

14. The method of claim 13, wherein the contacts of the UFMS are opened in response to current flowing through the UFMS and CS or ACB exceeding a predefined threshold.

15. The method of claim 12, wherein the dielectric strength is determined based upon a sensed contact displacement.

16. The method of claim 15, wherein the individual switching stages are turned off in response to the dielectric strength exceeding blocking voltage ratings of the corresponding surge arrestors connected across the individual switching stages.

17. The method of claim 12, wherein the dielectric strength is determined based upon preset time values corresponding to contact displacement after initiating opening the contacts of the UFMS.

18. The method of claim 17, wherein the individual switching stages are turned off in response to a series of preset time values associated with an opening speed of the contacts of the UFMS.

19. The method of claim 12, comprising identifying an anomaly in DCCB operation during opening of the contacts of the UFMS based upon monitored voltage and current of the hybrid DCCB.

20. The method of claim 19, wherein current through and voltage across the hybrid DCCB are continuously monitored during opening of the contacts of the UFMS.

* * * * *